United States Patent [19]

George, Jr. et al.

[11] 4,354,085
[45] Oct. 12, 1982

[54] PIPE WELDER WITH IMPROVED SEAM SPREADER

[75] Inventors: Kenneth E. George, Jr., McKeesport; Douglas E. Alexander, North Huntingdon, both of Pa.

[73] Assignee: United States Steel Corporation, Pittsburgh, Pa.

[21] Appl. No.: 220,552

[22] Filed: Dec. 29, 1980

[51] Int. Cl.³ .............................................. B23K 9/32
[52] U.S. Cl. .................................... 219/59.1; 219/79; 228/17.5
[58] Field of Search ................ 219/59.1, 79; 228/17.5; 72/113

[56] References Cited

U.S. PATENT DOCUMENTS 3,312,099  4/1967  Koepf ..................................... 72/392
3,495,064  2/1970  Grimoldi et al. .
3,937,054  2/1976  Hortvet et al. .

Primary Examiner—Elliot A. Goldberg
Attorney, Agent, or Firm—William F. Riesmeyer, III

[57] ABSTRACT

Improved apparatus is provided for spreading the seam edges of formed large diameter pipe so that it can be mounted more quickly onto the arbor of a welder. The conventional spreader apparatus comprised of a fixed straight arm with rollers on opposite ends has at least one cylinder axially substituted for at least part of its length so that the rollers are retractable. The cylinder is mounted in a bracket and freely slidable back and forth axially so as to be self-centering thus preventing displacement of the seam from proper alignment with the arbor as it is spread preparatory to movement thereon. Preferably, a pair of cylinders are provided attached in back to back relation with a roller connected to each piston rod thereof.

4 Claims, 2 Drawing Figures

PIPE WELDER WITH IMPROVED SEAM SPREADER

BACKGROUND OF THE INVENTION

This invention relates to apparatus for welding the seam of large diameter pipe, and particularly to an improvement in apparatus for spreading the seam edges preparatory to longitudinal movement of the pipe onto the arbor of the welding machine.

Devices are known for spreading the seam edges of pipe by permanent deformation prior to installation of the formed pipe on an outside diameter welding machine. A separate machine for this purpose is shown in U.S. Pat. No. 3,937,054 Hortvet. Probably more pertinent however, is the conventional means used in the past on some O.D. welders for spreading the seam edges. A transverse fixed arm was located ahead of the arbor and had rollers on its opposite ends for engaging the inner pipe walls. By forcing the pipe over this roller arm the edges were spread without permanent deformation just sufficiently to pass onto the arbor or spreader bar. In the conventional O.D. welder continued pushing of the pipe longitudinally onto the arbor forces the seam edges over fin rollers which assure proper abutment of them as the seam is closed preparatory to welding.

The difficulty with such prior apparatus was that if the pipe was not centered properly before spreading, one or both edges would hit the arbor and prevent passage of the pipe thereon. To correct this, the pipe would have to be moved back off the spreader arm and re-aligned prior to spreading. The conventional roller conveyor could not back the pipe off the arm so it had to be done manually with hooks and a crane. Of course this causes loss of production on the welder and is a safety hazard as well. Moreover, in extreme cases, particularly on softer grades of steel, the seam edges may be overlapped requiring manual prying or jacking of the pipe seam open.

It is therefore a primary object of this invention to provide an improved spreader for a pipe seam welding machine.

SUMMARY OF THE INVENTION

The conventional welder includes at least one weld head for joining opposite seam edges. It also has an arbor with opposed faces against which the opposite seam edges may be abutted to align them properly as they are closed preparatory to welding. A conveyor is provided for transporting the pipe longitudinally onto the arbor and includes means for axially rotating the pipe prior to transport for properly aligning the edges with respect to the arbor. In the conventional apparatus a spreader is provided which includes an elongated arm fixed in position adjacent an entry end of the arbor. The arm extends axially in a transverse direction across the approximate mid-point of the interior cross section of the pipe. Frictionless rollers mounted on opposite ends of the arm contact the pipe wall and spread the seam edges as the pipe is rolled over them onto the arbor. The improvement of this invention includes at least one fluid powered, preferably hydraulic, cylinder substituted for at least part of the length of the spreader arm. This permits retraction of the rollers if necessary to re-align and center the seam with the arbor.

The cylinder is mounted in a bracket so as to be freely slidable back and forth axially. This assures that the forces exerted by the opposed rollers on the respective pipe walls are equal, thus providing a self-centering feature and preventing displacement of the seam from center during spreading. In preferred form, a pair of back-to-back cylinders are provided with a roller attached to the oppositely directed piston rods. In this form the cylinders may not have to be axially slidable but this is preferred.

DESCRIPTION OF THE PREFERRED EMBODIMENT

Figure 1:
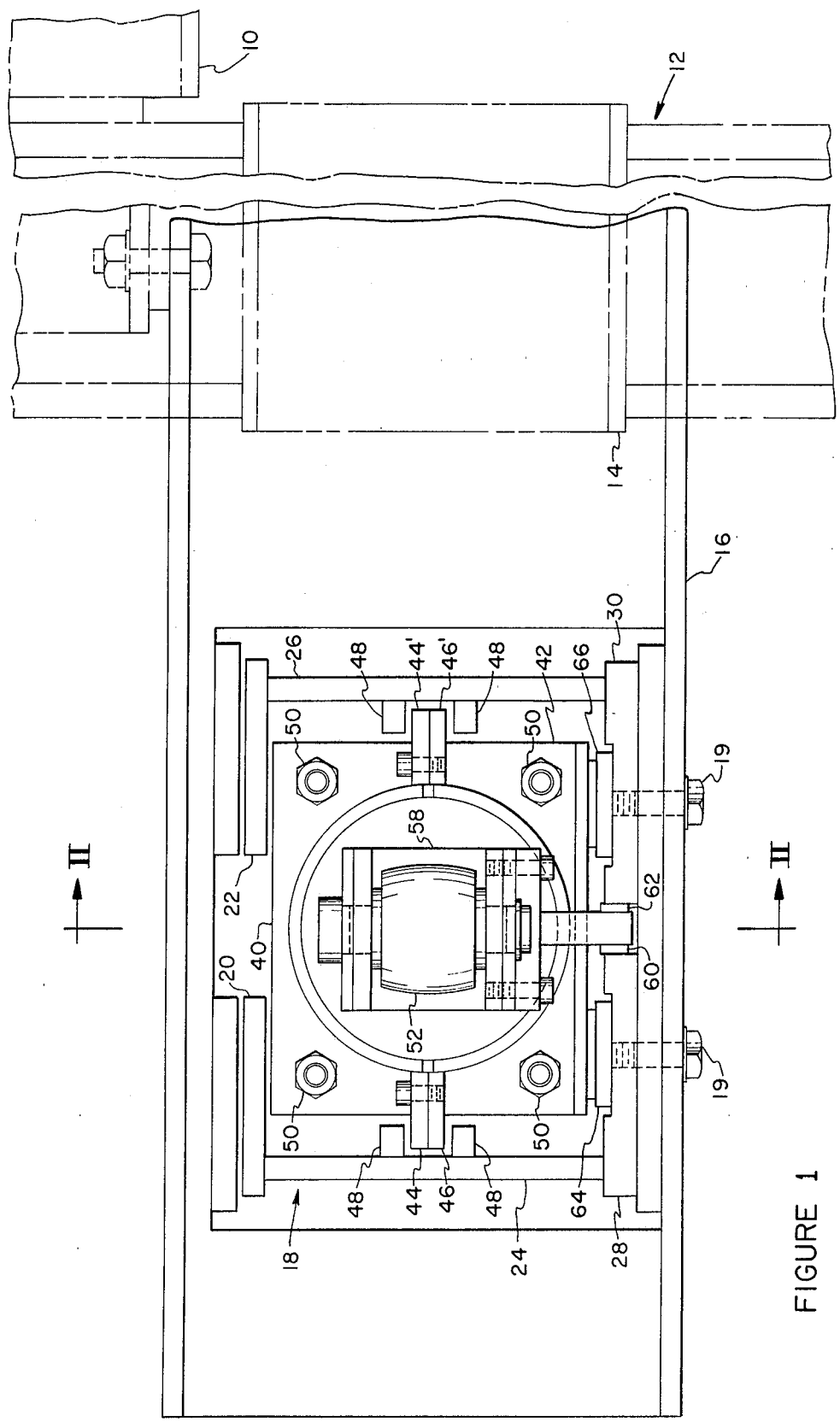
FIG. 1 is a side elevation view showing the apparatus of this invention attached to the arbor of a seam welder.

The invention is applicable to any pipe welding machine requiring spreading of the seam edges so that they will pass onto an arbor. Such welders are well known in the art and the details will not be repeated here. FIG. 1 shows a portion of the arbor 10 and first aligning stand 12 of such a welder. Rolls (not shown) mounted in housing 14 of the first stand abut the exterior pipe surface. These and rolls in succeeding aligning stands close the pipe as the seam edges pass over a series of fin rollers properly aligning them so that they tightly abut each other when closed in a partial flat surface extending lengthwise at the top of the pipe cross section.

Such welders usually have a conveyor associated with them of the general type shown in U.S. Pat. No. 3,495,064 Grimoldi et al, the specification of which is incorporated herein by reference. These conveyors have a plurality of spaced rollers (41 in FIG. 2 of Grimoldi) adjacent the entry end of the arbor. A pusher ram rolls the pipe along the conveyor and inserts it longitudinally onto the arbor and into the welder. In order to pass onto the arbor the seam edges must first be aligned generally in the top vertical position. This is accomplished by axially rotating the pipe by a second set of rollers of the type shown at 57 in FIG. 2 of Grimoldi.

Figure 2:
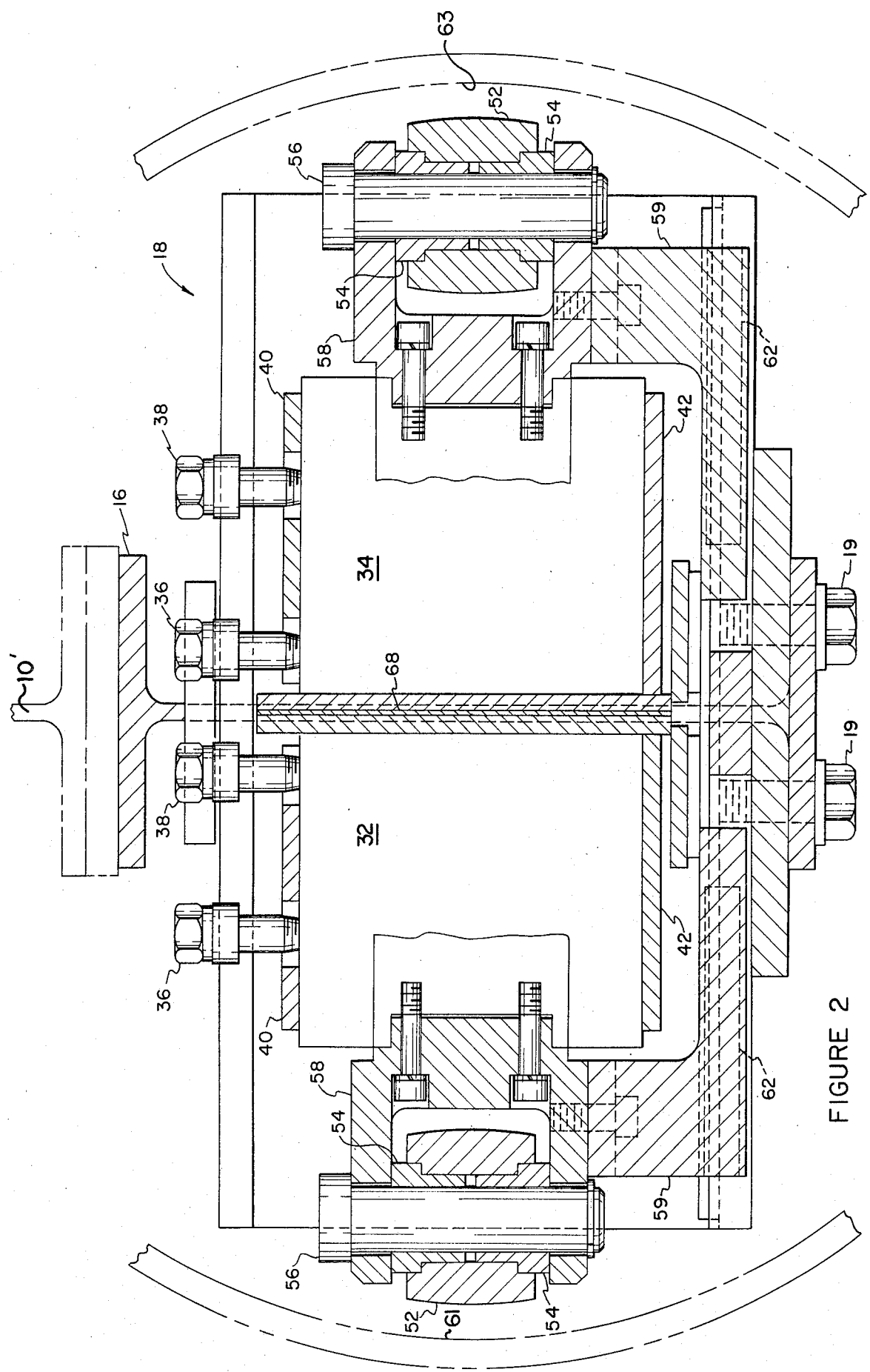
FIG. 2 is a section taken at II—II of FIG. 1.

Referring now to FIGS. 1 and 2 the apparatus of this invention includes a support 16 in the form of an I-beam bolted to the first aligning stand. A weld arbor 10' is mounted on support 16 similar to the arbor shown in the Grimoldi patent referred to above. An opening is provided in the beam for bracket 18 which is bolted to it as at 19. The bracket forms a housing for the spreader assembly. The particular bracket illustrated is made up of top plates 20, 22 welded to side plates 24, 26 in turn welded to bottom plates 28, 30. The spreader assembly includes back-to-back hydraulic cylinders 32, 34 for example model JDS-1502 made by the Enerpac Company. Each cylinder has ports 36, 38 FIG. 2 for introduction and exhaust of hydraulic fluid. The cylinders are mounted in covers comprising top section 40 and bottom 42 bolted together at flanges 44, 44' and 46, 46'. Ribs 48 serve as stiffeners for the bracket and rough locators for the cylinder covers. The cylinder covers are attached back-to-back by bolts 50 (FIG. 1).

A freely rotatable roller 52 is mounted on bushing 54 and pin 56 in clevis 58 attached to the piston rod of each cylinder. The rollers 52 are adapted to engage the walls 61, 63 of the pipe when the piston rods are extended, causing the seam edges of the pipe to open so that the pipe may be pushed onto the weld arbor 10'. A guide arm 59 formed integral with or attached to each clevis 58 has bronze liners 60, 62 FIG. 1 which ride in a track formed by the gap between bottom plates 28, 30 of the bracket. The arm and track take the load of the pipe on the rollers and prevent bending of the piston rod which would damage seals of the cylinders.

Bronze liners 64, 66 FIG. 1 on bottom plates 28, 30 respectively of the bracket permit the cylinders to slide axially as a unit. This provides a self-centering feature preventing displacement of the pipe seam as it is spreaad, for example which otherwise might be caused by non-simultaneous extension of the cylinder piston rods.

Shims 68 of various sizes are inserted between the cylinder covers in order to provide for different diameters of pipe to be spread.

For smaller pipes, for example from 24 to 30 inch diameter, each cylinder preferably has an arm with a pair of rollers mounted at spaced locations along the length of the pipe axis. This provides more leverage for spreading the seam in small diameters where more force is required.

We claim:

1. In pipe seam welding apparatus, said apparatus including at least one weld head for joining opposite edges of the seam, an arbor having opposed faces against which opposite of the seam edges may be abutted to properly align them as they are closed preparatory to welding, a conveyor for transporting the pipe longitudinally onto the arbor, means for axially rotating the pipe prior to transport so as to properly align the seam edges with respect to the opposite faces of the arbor, and means for spreading the seam sufficiently to permit passage of the edges thereof onto the arbor, said spreader means including an elongated arm fixed in position adjacent but outward of an entry end of said arbor and extending axially in a transverse direction across the mid-point of the interior cross section of the pipe, and frictionless rollers mounted on opposite ends of the arm for contacting the interior pipe wall so as to spread the seam as the pipe is rolled thereover onto the arbor, the improvement in said spreader means which comprises:

at least one fluid powered cylinder substituted axially for at least part of the length of said arm;

a bracket housing said cylinder, said cylinder being axially slidable back and forth therein so that equal forces are exerted against the pipe, thus preventing displacement of the seam from proper alignment with the arbor during spreading.

2. The apparatus of claim 1 in which said bracket includes a track guiding the back and forth movement of each roller means in order to prevent excessive wear on a seal of said at least one fluid powered cylinder.

3. The apparatus of claim 1 further comprising a second fluid powered cylinder mounted back to back with said at least one fluid powered cylinder and spacer means mounted between said cylinders for aligning said cylinders properly for the diameter of pipe to be spread.

* * * * *